(12) United States Patent
Cazals et al.

(10) Patent No.: US 8,336,811 B2
(45) Date of Patent: Dec. 25, 2012

(54) AIRCRAFT WITH ITS FUSELAGE SUSPENDED UNDER THE WING

(75) Inventors: Olivier Cazals, Daux (FR); Thierry Druot, Saint Jean (FR)

(73) Assignee: Airbus Operations SAS, Toulouse (FR)

( * ) Notice: Subject to any disclaimer, the term of this patent is extended or adjusted under 35 U.S.C. 154(b) by 541 days.

(21) Appl. No.: 12/541,256

(22) Filed: Aug. 14, 2009

(65) Prior Publication Data

US 2010/0059623 A1 Mar. 11, 2010

(30) Foreign Application Priority Data

Aug. 29, 2008 (FR) ...................................... 08 55799

(51) Int. Cl.
*B64C 37/02* (2006.01)
(52) U.S. Cl. ............................................. 244/46; 244/2
(58) Field of Classification Search ................ 244/2, 87, 244/88, 38, 39, 138 R, 139, 140, 46, 99.11
See application file for complete search history.

(56) References Cited

U.S. PATENT DOCUMENTS

| | | | |
|---|---|---|---|
| 2,063,030 A | | 12/1936 | Goodman |
| 3,179,352 A | * | 4/1965 | Nelson ........................... 244/7 C |
| 3,258,228 A | * | 6/1966 | Crook ............................... 244/46 |
| 3,288,421 A | * | 11/1966 | Peterson ......................... 248/396 |
| 3,516,624 A | * | 6/1970 | Crook ................................. 244/2 |
| 5,179,525 A | * | 1/1993 | Griffis et al. ........................ 703/1 |
| 6,354,540 B1 | * | 3/2002 | Lewis et al. ................. 244/172.4 |

FOREIGN PATENT DOCUMENTS

| | | |
|---|---|---|
| DE | 714 333 C | 12/1941 |
| DE | 10 2006 047601 A1 | 12/2007 |
| DK | 200701575 * | 11/2007 |
| GB | 375 530 A | 6/1932 |
| GB | 455462 * | 10/1936 |
| GB | 595 494 A | 12/1947 |
| GB | 907950 * | 10/1962 |

* cited by examiner

*Primary Examiner* — Tien Dinh
*Assistant Examiner* — Michael Kreiner
(74) *Attorney, Agent, or Firm* — Perman & Green, LLP

(57) ABSTRACT

An aircraft includes a reference system including a longitudinal X axis, a vertical Z axis perpendicular to the X axis, and a lateral Y axis perpendicular to the plane defined by the X and Z axes, a fuselage, a wing affixed to an upper central part of the fuselage, a set of rear airfoils situated behind the wing, and propulsion engines mounted on the wing, where the wing, the set of rear airfoils and the propulsion engines are parts of an aero-propulsive unit forming a structure independent of the fuselage, and where the aero-propulsive unit is connected to the fuselage by a six degrees of freedom connection system using arms with lengths modified to control a position of the aero-propulsive unit relative to the fuselage along the X, Y and Z axes and in rotation about the X, Y and Z axes, during flight.

17 Claims, 8 Drawing Sheets

AIRCRAFT WITH ITS FUSELAGE SUSPENDED UNDER THE WING

CROSS-REFERENCE TO RELATED APPLICATIONS

This application claims priority to and the benefit of French Application No. 08 55799 filed on 29 Aug. 2008.

BACKGROUND

The aspects of the disclosed embodiments pertain to the field of transport aircraft. More specifically, the aspects of the disclosed embodiments concern an aircraft with a wing positioned above the fuselage with the ability to move the wing in flight relative to the fuselage.

In a broadly expanded aerodynamic architecture corresponding to the great majority of modern aircraft in particular for transport aircraft, the aircraft has a fuselage of generally elongated shape to which a wing is attached in a central part of the fuselage along its length and to which a set of airfoils is attached, including a vertical airfoil or V-tail and a horizontal airfoil or stabilizer intended to assure the aerodynamic stability of the aircraft in flight and its control using flaps of the airfoils.

The aircraft also has one or more engines that are mounted on the wing or fuselage, depending on the case. In such designs, the wing, which is generally of separate form from the fuselage, is mounted on the fuselage. The wing may be mounted on a lower part of the fuselage, e.g., in the case of an aircraft of the Airbus A320 type, on an upper part of the fuselage, e.g., on an aircraft of the ATR72 type, or following a less common configuration for transport aircraft, in a position of intermediate height, as in the case of the Breguet 765 aircraft.

In all of these examples of an aircraft representative of the most widely used transport aircraft, the wing is fixed to the fuselage so as to be held in a fixed position and to transmit to the fuselage structure all of the aerodynamic forces, propulsive forces and inertial forces that are encountered during flight. Numerous technical designs have been created and are used to realize the structural junction between the fuselage and the wing.

According to a specific engineering design applied to certain aircraft whose wing is above the fuselage, the wing is attached to the fuselage using forks and connecting rods assuring the transmission of forces.

The designs for static fixation of a wing to a fuselage are advantageous from the standpoint of the structural design, in particular with respect to the ratio of the weight of the fixation means to the forces transmitted, but they also require the designer of the aircraft to determine the average values of the wing positions, in particular, an angular setting relative to a reference fuselage and a longitudinal position on the fuselage, which are compromises and are only optimal for one or a few conditions of flight. Furthermore, the aircraft designer determines the longitudinal position of the wing on the fuselage in order to comply with the restricted positions of the center of gravity, and this further requires controlling the center of gravity as a function of this choice with no further action possible.

The designer also determines the setting angle of the wing, i.e. an angle of incidence of a reference profile of the wing relative to the axis of the fuselage, generally in order to assure an essentially horizontal position of the axis of the fuselage for an average cruising weight in order to minimize the aerodynamic drag of the fuselage and to benefit from an essentially horizontal floor of the cabin for the comfort of the passengers. However, outside of the conditions of flight (weight, speed and altitude), which resulted in the determining of the wing setting, in general the fuselage has neither a zero aerodynamic incidence nor a horizontal floor.

Some aircraft have a wing that is mobile relative to the fuselage when in flight. However, the movements of the wing of such aircraft are confined to the capacity of the wing to pivot around a fixed axis relative to the fuselage and have essentially only been used in experimental aircraft.

For example, the wing pivots to cause the setting angle to vary around a value close to the mean value in order to regulate the setting angle or, more frequently, to achieve attitude control by direct action on the wing angle of attack. The number of solutions conceived on this principle is relatively large, e.g., the "pou du ciel" design developed by Henry Mignet, a description of which is given in the patent GB 455 462. Although providing a partial answer to the problem of optimal wing angular setting as a function of the conditions of flight, the solution proposed of rotation of the wing around an axis under the influence of an actuator has not resulted in sufficient advantages to be implemented in transport aircraft.

For example, the wing pivoted to vary the angle of incidence up to a value of 90.degree in order to orient the thrust of the engines (or propellers) upward and permit a vertical takeoff and then take back a low angle of incidence close to 0.degree. for conventional cruising flight as in the Veserflug P1003 design or on the experimental aircraft Canadair CL84. This mobile wing solution, an example of which is described in the patent application GB 907 590, has a very specific objective and does not appear to be of use for improving the situation of transport aircraft.

For example, the wing pivoting, about a vertical axis in the reference axis system of the aircraft, at the level of the fuselage in order to vary the sweep of the wing anti-symmetrically to adapt the wing to the Mach number of flight with a configuration called oblique wing. This type of mobile wing as in the Messerschmidt P202 design and tested in flight on the NASA experimental aircraft ADI only provides a solution to the problem of adaptation of the two-dimensional shape of the wing to the speed of flight and has been the subject of research as an alternative solution to variable swept-wing aircraft, a heavy, costly solution and the source of numerous technical difficulties that has only found application on armed military aircraft.

SUMMARY

In one aspect a disclosed embodiment is directed toward improving perceptibly the situation of transport aircraft with respect to the problems of position of the center of gravity and of the wing incidence and also has the ability to improve flight control, reduce gusts effects and modify fundamentally the configuration of the aircraft.

In one embodiment, the aircraft has a reference system determined by a longitudinal X axis oriented positively toward the front of the aircraft, a vertical Z axis perpendicular to the X axis and oriented positively toward the bottom of the aircraft and a lateral Y axis perpendicular to the plane defined by the X and Z axes and oriented positively toward the right of the aircraft. The aircraft also has a fuselage, a wing attached to the fuselage in an upper central part of the fuselage along the longitudinal axis X, a set of rear airfoils: a vertical stabilizer and a horizontal stabilizer, situated behind the wing and propulsion engines mounted on the wing.

In the Configuration of the Disclosed Embodiments:
the wing, the set of rear airfoils and the propulsion engines are part of a structural assembly called the aero-propulsive unit which is independent of the fuselage except by a linking interface; and
the aero-propulsive unit is connected to the fuselage by a connection system to control a modification in flight of the position of the aero-propulsive unit relative to the fuselage in the three directions X, Y and Z of the reference axis system of the aircraft and in rotation about the three directions X, Y and Z.

Within the limits of linear and angular displacement, the aero-propulsive unit is therefore mobile with six degrees of freedom above the fuselage. To assure these degrees of freedom, the connection system has a set of n supporting arms, n being equal to or greater than six, each supporting arm being jointed by a ball and socket joint to a lower end at the level of an upper part of the fuselage, being connected also by a ball and socket joint to an upper end at the level of the lower part of the wing, the length of each supporting arm being adjustable in flight.

For reasons of strength and to assure preferred design, the connection system has eight supporting arms conforming to a fixture called octopoda and the upper ends of the supporting arms are jointed close to structural ribs of the wing, said ribs are advantageously integrated with the front and rear wing spars of the wing. In order to modify the length of the supporting arms effectively with the necessary force and speed, each supporting arm has an actuator whose length is adjustable, e.g., a hydraulic actuator of the servo-control type or an electro-hydraulic actuator.

The aerodynamic drag of every supporting arm in aerodynamic flow in flight is limited by an aerodynamic fairing enveloping the actuator, and the available space in each fairing is advantageously used to install pipes and wires of systems which are supposed to circulate between aero-propulsive system and fuselage.

To assure a quick separation and a secure assembly of the aero-propulsive system of the fuselage, advantageously the lower ends of the supporting arms are hinge-jointed to a support assembly having a front frame part and a rear frame part and spars assembled to the front frame part and rear frame part, and the support assembly is affixed in a recess on the fuselage, preferably between a strong front frame and a strong back frame and above a ceiling of a fuselage cabin.

Advantageously, the support assembly and the fuselage are firmly joined by removable mounts such that the fuselage affixed under an aero-propulsive system can be replaced quickly, e.g., for changing a damaged fuselage or to replace the fuselage adapted for one mission by another adapted to a different mission.

To improve the performance of the aircraft, a device or devices for controlling the movements of the aero-propulsive system relative to the fuselage in flight generates displacements of the aero-propulsive system relative to the fuselage:
  as a function of a position of a center of gravity of the aircraft in order to improve the load-carrying capacity of the aircraft.
  as a function of a phase of flight to optimize the position of the fuselage relative to the wing;
  to modify or maintain a flight path of the aircraft and assure functions similar to the functions realized by conventional flight control systems;
  to weaken the effects of air turbulence.

The rear airfoils are advantageously integrally joined to the wing by means of two longitudinal beams which avoids interference with the fuselage and allow a greater freedom of design of the shapes of the fuselage and loading systems.

The longitudinal beams are preferably of sufficient length, and if necessary, of sufficient height above the fuselage to permit the opening, without interfering with the longitudinal beams or rear airfoils, of a cargo door located to the rear of the fuselage and opening by pivoting sidewise or upward of all or part of the rear end of the fuselage.

DESCRIPTION OF THE DRAWINGS

The aircraft with fuselage suspended under the wing according to the disclosed embodiments are described with reference to the figures, which represent, schematically.

DESCRIPTION OF THE ENCLOSED EMBODIMENTS

Figure 1A:
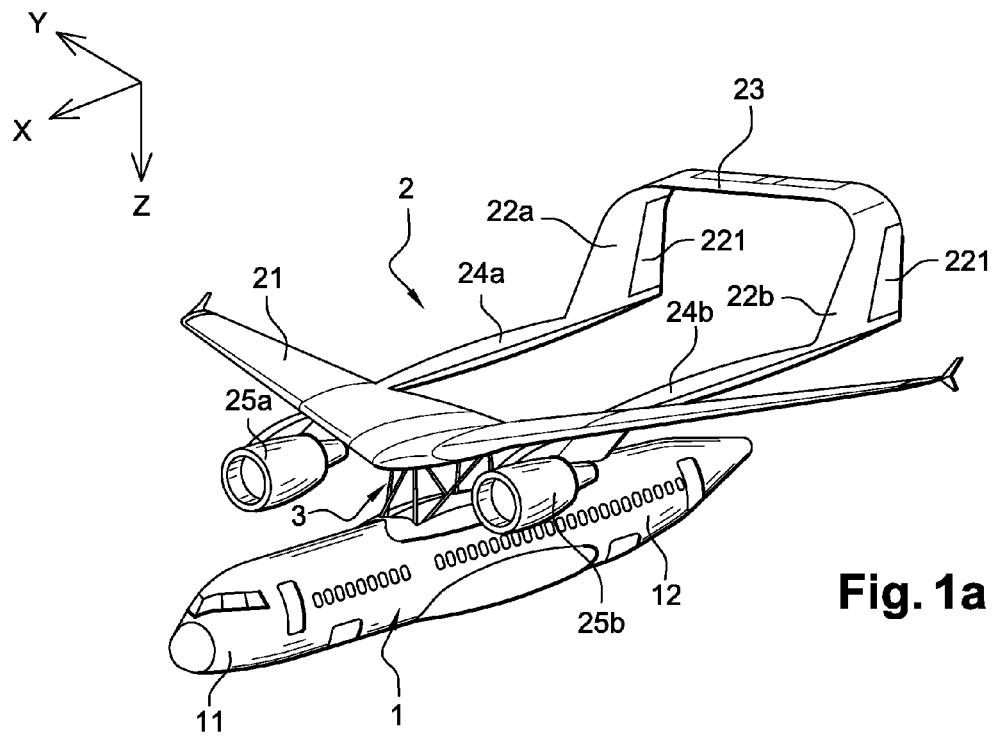
FIGS. 1a and 1b: Perspective views of an aircraft according to an embodiment.
Figure 1B:
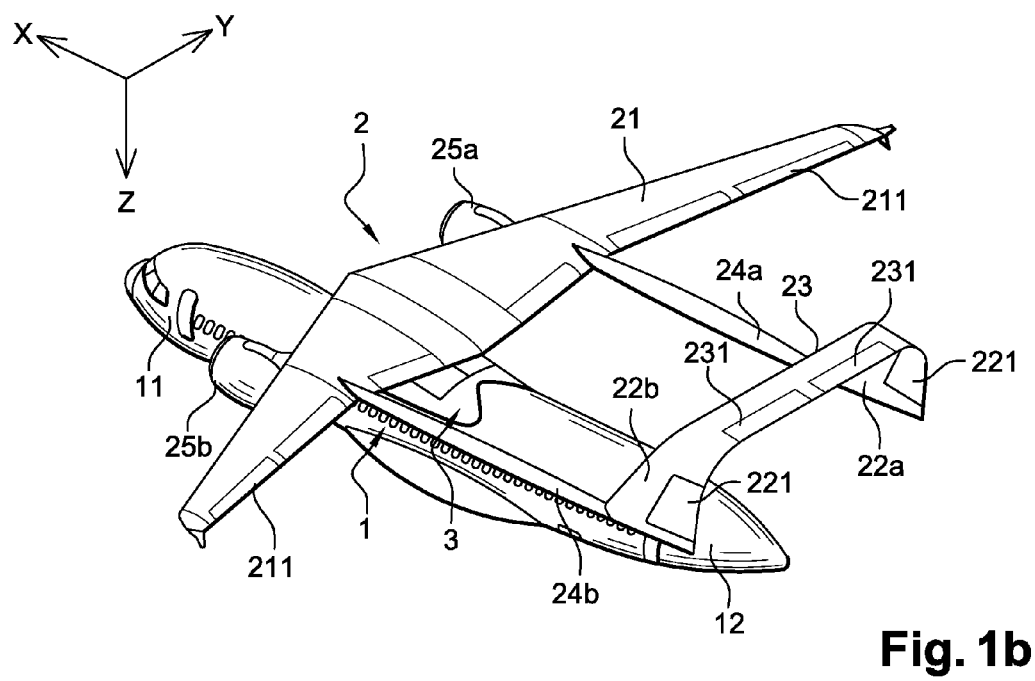
Figure 2A:
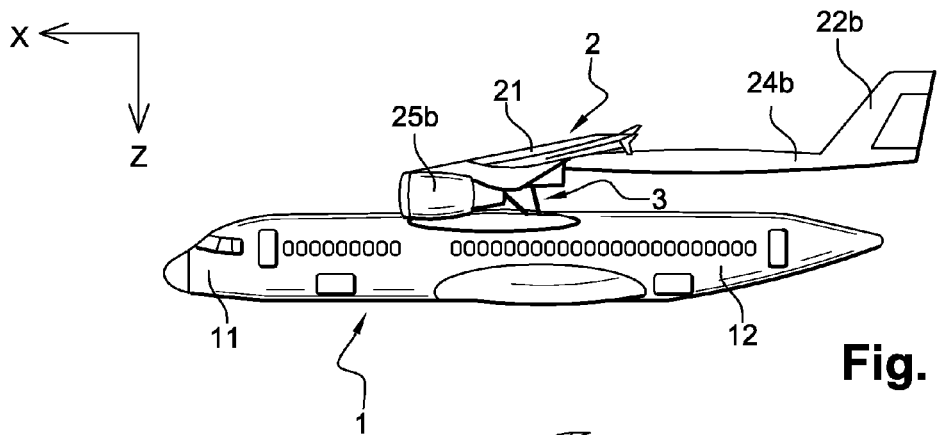
FIGS. 2a, 2b and 2c: respectively, views from the side, from the above and from the front of the aircraft in FIGS. 1a and 1b.
Figure 2B:
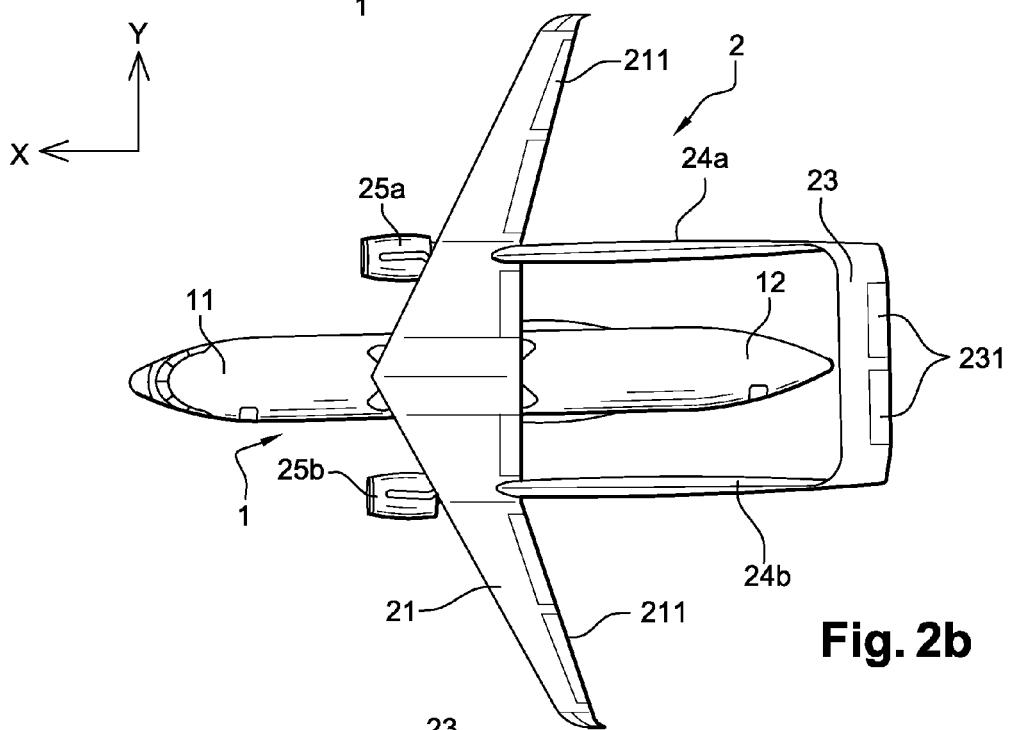
Figure 2C:
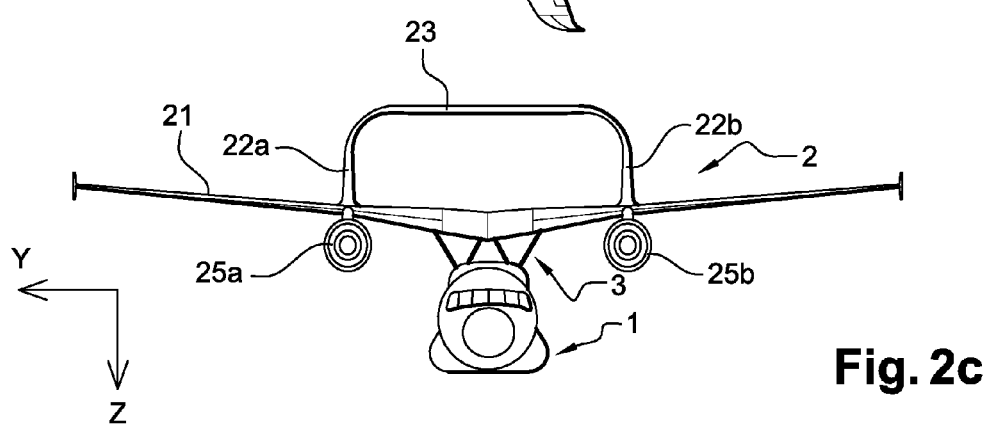

An aircraft according to an embodiment such as is shown in FIGS. 1a, 1b and 2a, 2b, and 2c has a first unit 1, said fuselage, above which a second unit, said aero-propulsive unit, is mounted by way of a third assembly 3, said connecting system, which holds said fuselage when in flight suspended below and a certain distance from the aero-propulsive unit.

In the description we shall use a conventional aircraft reference system in which an axis X is oriented toward the front of the aircraft essentially parallel to a longitudinal axis of the fuselage, a vertical Z axis oriented positively toward the bottom of the aircraft and a Y axis orthogonal to the X and Z axes and positively toward the right side of the aircraft.

The fuselage 1 has well known characteristics, in particular of an aircraft with a high wing configuration:
  a front part 11 at the front end.
  a tail cone 12 at the rear end.
  a main landing gear 13a and auxiliary landing gear 13b.

The aero-propulsive unit 2 displays the various conventional aerodynamic surfaces of an aircraft:
a wing 21; [
a vertical tail [stabilizer] 22a, 22b
a horizontal stabilizer [tail plane] 23.

The tail air foils 22a, 22b and 23 being part of the aero-propulsive unit, said airfoils are mounted in relation to the wing in terms of distance and position by means of at least two structural beams 24a, 24b fixed to the wing 21 in their front parts.

For better rigidity and structural integrity of the beams 24a, 24b, said beams are preferably connected to each other by the horizontal stabilizer.

In the examples shown, each beam 24a, 24b is provided with a vertical fin, 22a and 22b respectively, of the vertical stabilizer and said fins being connected in their upper part by the horizontal stabilizer 23 to form a.π.(pi) configuration.

This .π. configuration has advantages that will be discussed later, but other configurations are possible, e.g. a H configuration (not shown) in which the beams 24a, 24b are connected by the horizontal stabilizer 23.

The aero-propulsive unit 2 also has propulsion engines 25a, 25b, e.g. two jet engines as shown in FIGS. 1a, 1b, 2a, 2b, 2c, mounted on the wing 21 in the conventional manner.

Advantageously, in order to benefit the structural stiffeners of the wing in the zone where the engines are mounted, the beams 24a, 24b are attached to the wing 21 in the zone of attachment of said engines.

Figure 4A:
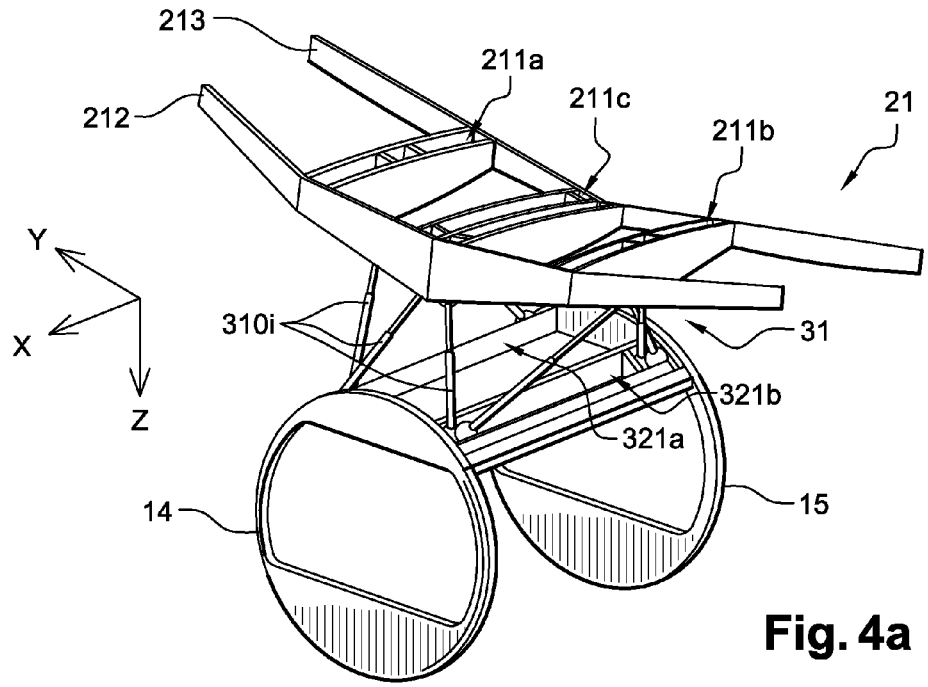
FIGS. 4a and 4b: perspective cut-away views of the zone where the wing and fuselage according to the invention are connected in the assembled state, FIG. 4a, and in separated position, FIG. 4b.
Figure 4B:
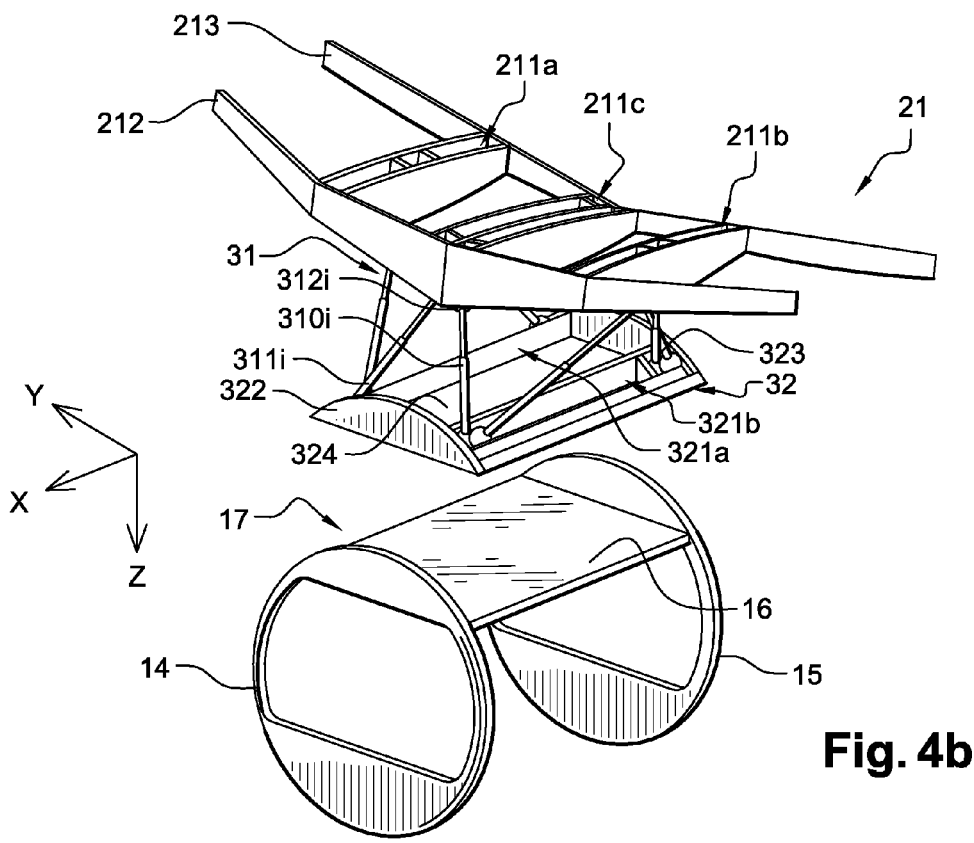

The connection system 3, whose primary components are shown in FIGS. 4a and 4b, consists essentially of a unit of n supporting arms, where n is at least equal to 6, in which each supporting arm 310i, where 1≦i≦n, has a variable length between a lower hinge joint 311i connected to a support assembly 32 and an upper hinge joint 312i connected to the wing 21.

In a preferred variant, each supporting arm incorporates a linear actuator such as a servo mechanism which acts on the length of the supporting arm.

The layout of the n supporting arms 310i is such that the set of said supporting arms, with the structures to which they are attached, constitutes a unit having a latticework geometry with triangular meshes that is at least isostatic when the supporting arms each have a specified length.

The layout of the n actuators is such that by acting on the length of the different supporting arms, the wing 21 joined solidly to the upper joints 312i of the supporting arms, is mobile within the limits permitted by the possible variations of length of the supporting arms relative to the support assembly 32 according to six degrees of freedom, i.e. in translation in the three primary directions X, Y and Z of the reference system of the aircraft and in rotation around the same three primary directions.

The realization of said movements by a device with n=6 supporting arms of modifiable lengths is well known especially in the field of mobile platforms for aircraft flight simulators as well as in the field of machining for the displacement of the machine head. The devices with 6 actuators are generally called "hexapod", and an illustration of their principles and their function is given, for example in the U.S. Pat. No. 3,288,421.

Figure 3:
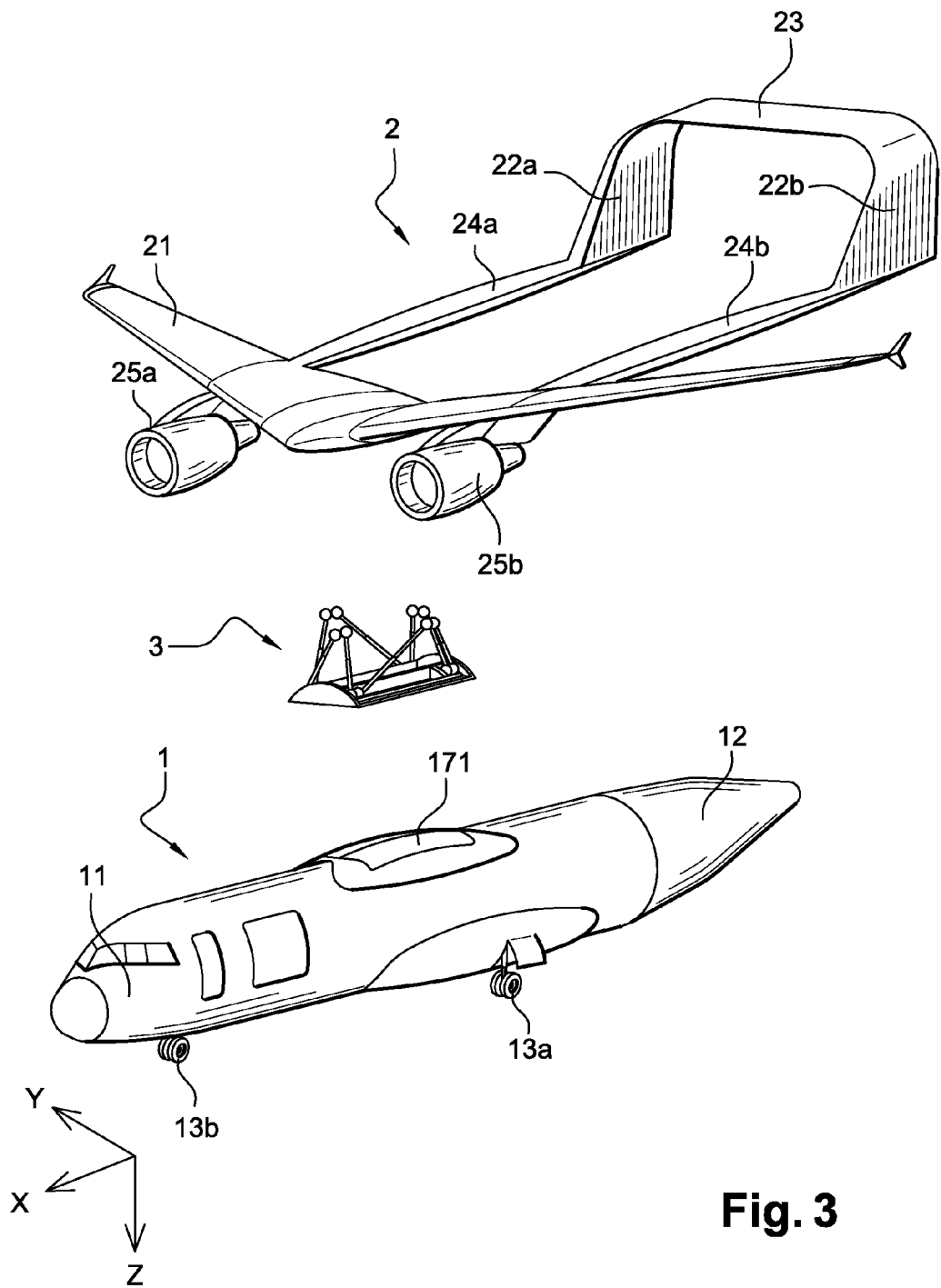
FIG. 3: a perspective view of the main separate sub-assemblies of the aircraft in FIGS. 1 and 2.

In the present application to the connection system 3, advantageously the number of supporting arms is increased. For example, at least n=8 supporting arms are used as illustrated in FIG. 3 and FIGS. 4a and 4b.

This "octopoda" device permits a redundancy of connections which is required for a high level of safety in the present application. The functioning principles of an octopoda device are similar on the theoretical level to those of an hexapod device.

Different modes of functioning can be achieved by allowing for this situation. In practice the number n of supporting arms 310i can be either equal to or greater than 6, to the extent that the lengths of each of said supporting arms are adapted by a control system for the supporting arms allowing at all times for the distances between the upper and lower hinge joints determined by the relative position between the wing 21 and the support assembly 32.

The supporting arms incorporate, for instance, hydraulic jacks having two chambers, one for every direction of displacement of a plunger of the jack, similar to jacks utilized in the servo mechanisms of aircraft controls, with external or integrated hydraulic power (EHA type) or of another technology for instance an electrically powered actuator.

The hinges 311i, 312i at the ends of the supporting arms 310i are realized for assuring the transmission of forces by each supporting arm in all directions that can be reached by the supporting arm in question considering the set of relative movements desired for the wing 21 relative to the support assembly 32.

Such hinge joints are advantageously realized by using ball joints capable of functioning with low play so that the forces in the supporting arms are forces of tension or of compression.

Referring to FIGS. 4a and 4b, the upper hinge joints 312i affixed to the wing 21 and the lower one 311i affixed to the support assembly 32 are associated with structural element that are both resistant, with respect forces being transmitted, and of a secure design, e.g. according to a structural concept called "fail safe" in which different routing of forces is possible in the case of a failure of a structural element.

Therefore, at the level of the wing 21 of ribs 211a, 211b, 211c, preferably pairs of ribs that are rigidly affixed to the spars of the airfoil 212, 213, are actuated at the level of the connecting points of the upper hinges 312i.

Similarly, the support plate 32 has spars 321a, 321b oriented essentially in the longitudinal direction X, preferably pairs of spars rigidly connected to the front 322 and rear 323 fuselage frames essentially in a plane YX relative to the aircraft. The support assembly 32 advantageously has a base 324 rigidly connected to the parts of frames 322, 323 and of the spars 321a, 321b and which participates in the structural resistance of the support plate.

In one variant, the support assembly 32 is a structural unit integral to the fuselage. In this case, the essential constitutive elements of the support assembly 32 coincide with the structural elements of the fuselage, especially a strong front frame 14 and a strong rear frame 15 correspond to the frame parts of the support assembly and a reinforced ceiling of the cabin 16 for the bottom 324.

In a preferred variant, when it is desired to have easy disassembly of the connection system 3 relative to the fuselage 1, the structure of the support assembly 32 which has, in particular, the parts of frames 322, 323, the spars 321a, 321b and the bottom 324, is independent of the fuselage 1 and said fuselage has a structure having strong frames in front 14 and rear 15 and the ceiling 16, said strong frames and said ceiling defining in the upper part of the fuselage a recess 17 in which the support plate 32 is inserted and fastened.

Fairings of the fuselage 171 are mounted on the fuselage 1 in the zone of the recess 17 so that the aerodynamic continuity of the fuselage 1 is assured when the linkage system 3 is rigidly affixed to said fuselage.

The fairings of the fuselage 171 have openings adapted for the necessary passage of each supporting arm 310i and for its possible movements when functioning. Sliding or deformable joints, not shown but of known technology, are preferably used at the level of the openings to avoid perturbations of the aerodynamic flow in the joint zones.

As shown in the different figures, the supporting arms 310i on their greatest lengths are visible and therefore exposed to aerodynamic flow in a free space between the top of the fuselage 1 and the bottom of the wing 21 under which said fuselage is suspended.

Figures 5A, 5B:
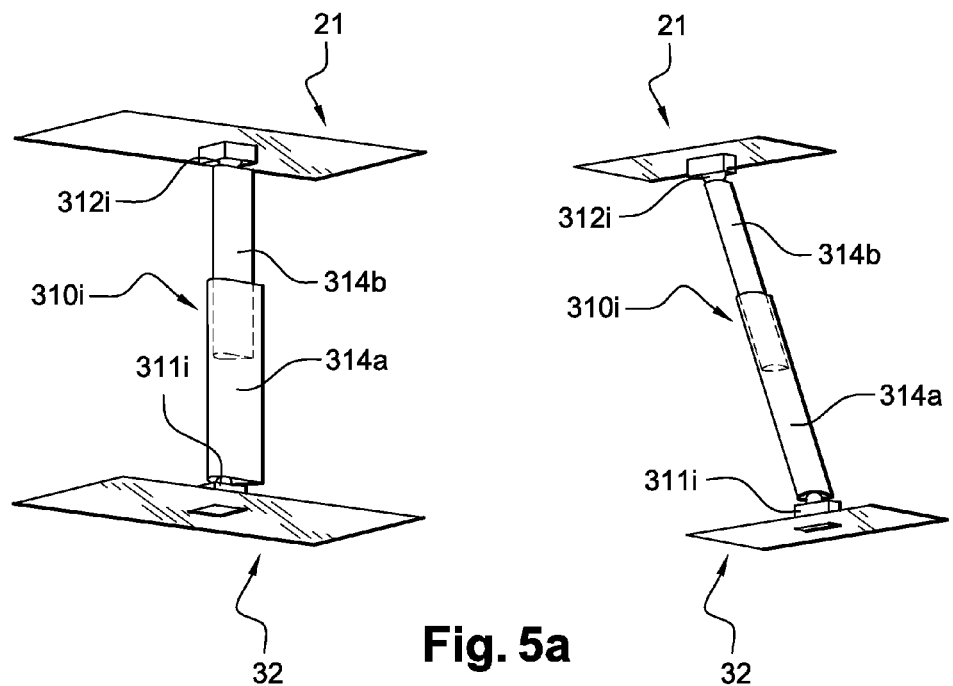
FIG. 5a: a view illustrating the principle of actuators of the connection system.
FIG. 5b: a section through an actuator

In a preferred mode of realization, the exposed part of each supporting arm 310i displays, as shown in FIGS. 5a and 5b, an aerodynamic fairing 314 which envelops the actuator 313 of the supporting arm, fairing 314 whose length is supposed to be adapted to the length of the supporting arm, e.g., by using sliding elements 314a, 314b in a socket joint.

As FIG. 5b illustrates, the fairings of the different actuators are advantageously utilized to assure the passage of the connections 315 of different systems (air, hydraulics, electricity, control and command signals) between the aero-propulsive unit 2 and the fuselage 1, the number of supporting arms and therefore of possible routings being sufficient to have the separation and redundancy desired in most cases for the different circuits, which are preferably split up among the different supporting arms.

One will better understand the advantages of the invention from the functional description of the different possible uses of the connection system within the scope of operational use of the aircraft.

One skilled in the art will then be able to define the laws of control of the connection device 3, in particular in terms of activation logic and functional dynamics, which are of the same nature as the laws of flight control of a modern aircraft.

In the following, a non-exhaustive description is given of the invention by examples of the elementary functions considered separately but which can be well understood as combined as long as the combination in question does not lead to a conflict incapable of being resolved between the functions executed.

It should be understood that the means of command and control not described are associated with each of the functions for actuating the connection system (3), e.g., the calculators of a flight control system which also receive from sensors or other equipment the information on the conditions of flight and the status of the aircraft system.

1—Function "Wing Setting" (Rotation around Y Axis):

The connection system 3 allows to rotate around an axis parallel to the Y axis the aero-propulsive unit 2 relative to the fuselage 1 and therefore allows the modification in flight of the setting angle of the wing 21 relative to the fuselage.

By this means it is therefore possible:

to modify the aerodynamic incidence of the fuselage 1 separately from the incidence of the wing 21 in such a way that said aerodynamic incidence of the fuselage minimizes the aerodynamic drag especially when cruising as a function of the flight conditions;

to manage the attitude of the fuselage 1, i.e. its position referred to local ground reference system, in order to optimize the passenger comfort of the aircraft, e.g., by keeping the fuselage in an essentially horizontal position when the aerodynamic incidence of the wing varies;

to manage the attitude of the fuselage 1 to optimize the operations of back dropping using gravity without modifying the aerodynamic incidence of the wing;

to limit the rotation of the fuselage during takeoffs or maneuvering of vertical resources in flight.

2—Function "Displacement of the Center of Aerodynamic Thrust" (Translation Along X Axis)

The connection system 3 through the possible displacement along the X axis of the aero-propulsive unit 2 relative to the fuselage 1 allows the modification of relative position of the center of gravity of the aircraft and of a center of aerodynamic force of lift essentially determined by the aerodynamic surfaces, the wing 21, and the horizontal stabilizer 23.

By this function it is possible:

to extend the loading limits of the fuselage 1 forward and rearward of the center of gravity of the fuselage, resulting from the commercial load in the fuselage, by modifying the longitudinal position of the fuselage such that the resulting center of gravity of the aircraft remains between the acceptable front and rear limits, considering also the variations in flight of fuel distribution whose weight and repartition change due to the fuel consumption of the engines;

to manage the centering in flight in order to favor according to the phases of flight, e.g., the conditions of stability or the conditions of aerodynamic drag;

to control the longitudinal attitude of the aircraft either in conjunction with the aerodynamic flaps of the elevator 231 of horizontal stabilizer 23 or by the sole means of displacement along the X axis of the aero-propulsive unit 2 in the phases of flight where such a means would prove to be adapted or in the case of failure of aerodynamic flaps.

3—Function "Control of Sideslip Angle" (Rotation Around Z Axis):

The connection system 3 allows a rotation of the aero-propulsive unit 2 around an axis parallel to the vertical axis Z of the reference system of the aircraft.

This relative movement permits modification in flight of an aerodynamic sideslip of the fuselage 1 relative to that of the wing 21, which permits:

maintaining the wing 21 in an optimal aerodynamic configuration, i.e. with a symmetrical flow without sideslip, in horizontal rectilinear flight, with a fuselage 1 biased in direction. Therefore, during an approach having a lateral wind component, the fuselage 1 and the landing gear 13a, 13b rigidly affixed to the fuselage may be oriented in a direction of the velocity vector relative to the ground while the aero-propulsive unit 2 is held in symmetrical aerodynamic conditions of flight with respect to the aero-propulsive system. This mode of implementing the invention permits to perform landing approaches in a crosswind without a decrabbing operation.

to control sideslip by rotation of the vertical stabilizer 22a, 22b, firmly joined to the aero-propulsive unit 2 and to obtain effects similar to those of aerodynamic flaps 221 of the vertical stabilizer.

4—Function "Lateral Pendular Control" (Translation along Y Axis):

The connection system 3 allows translations of the aero-propulsive unit 2 in a direction parallel to the lateral direction parallel to the Y axis of the reference system of the aircraft.

This movement allows lateral offset by a value $\Delta Y$ in the reference system of the aircraft of the center of gravity of the fuselage 1, a priori close to a plane of vertical symmetry of the fuselage, relative to the center of aerodynamic thrust of the aero-propulsive unit, a priori close to a plane of vertical symmetry of said aero-propulsive unit.

The offset of the value .DELTA.Y creates a couple of rolls which tend to cause the plane to turn around an axis parallel to the longitudinal X axis.

Therefore, by a pendular type piloting it is possible to assure the control in rolls of the aircraft in flight, pendular piloting which can be used in coordination with aerodynamic flaps like ailerons 211, e.g., arranged on the wing, or alone either as a means of principal control of roll or as a means of assistance in case of failure of the conventional aerodynamic controls.

5—Function "Lateral Aerodynamic Control" (Rotation Around X Axis):

The connection system 3 allows a rotation of the aero-propulsive unit 2 around an axis parallel to the longitudinal axis X of the reference system of the aircraft.

This possibility of orientation of the aero-propulsive unit 2 and in particular of the wing 21 permits the control of rolls of the aircraft and therefore of turns. Such a capability of the aircraft of the invention permits the use of ailerons 211 on the wing 21 to be limited or even to avoid the installation of such ailerons. In a particular mode of realization of this function, the aircraft executes a stabilized turn without lateral tilt of the fuselage 1 relative to the local ground.

If such a configuration is not optimal with respect to the comfort of the occupants of the fuselage, it nevertheless permits maintaining an attitude of the fuselage 1 in a ground reference system when the aircraft is used for applications such as an observation platform.

6—Function "Lateral Stability" (Translation along Z Axis):

The connection system 3 allows a translation of the aero-propulsive unit 2 in a direction parallel to the vertical direction parallel to the Z axis of the reference system of the aircraft. Such a function when used in flight modifies the distance between wing 21 and the top of the fuselage 1 and consequently to move away or approach vertically a point of application of lift aerodynamic forces on the aero-propulsive unit 2 from the center of gravity of the fuselage 1. This has the effect of changing the intensity of a reactive force when said point of application of aerodynamic forces and said center of gravity are offset laterally along the Y axis.

In a ground maintenance application that will be presented later, the actuators 313 then being powered by an auxiliary power source, the actuators permit the raising of the support assembly 32 after it is disconnected from the fuselage.

7—Function "Attenuation of Turbulence" (all Axes):

By a proper choice of the dynamics of the actuators 313 used by the aircraft of the invention, advantageously the functions which more or less perform attenuation of turbulence encountered in flight are realized.

The advantages of attenuating turbulence in flight such as passenger comfort as well as on the aging of the structures of an aircraft are well known.

The effect on the relative movements of the fuselage 1 and the aero-propulsive unit 2, main origin of aerodynamic forces induced by turbulence, allows to attenuate the effects of said turbulence at least within certain limits of amplitude and frequency.

Therefore, the movements:

in translation along Z axis notably allow attenuation of turbulence induced by vertical gusts;

in rotation around X axis notably allow attenuation of turbulence induced by vertical unsymmetrical gusts along the span of the wing 21;

in rotation around Y axis notably allow attenuation of turbulence induced by horizontal gusts parallel to the direction of flight.

The aircraft according to the invention also has other both industrial and exploitation advantages due to the possibility of the relatively easy and rapid decoupling of the fuselage 1 from the aero-propulsive unit 2 associated with the connection system 3.

On the industrial level, first, the aero-propulsive unit 2 and the connection system 3 can be designed and manufactured (for a given type of aircraft) independently of the layout of the fuselage 1 or even a type of fuselage.

In fact, the aero-propulsive unit 2 conforms to the essentially technical requirements of the aircraft that do not depend on the specific requirements of the operator of the aircraft.

On the contrary, the fuselage through its configurations, say its length or shape, displays significant variations as a function of the requirements of the aircraft operators and the mission to be performed by the aircraft.

The production of the fuselage 1 for an aircraft according to the invention may therefore be done without inconvenience independently of the production of the aero-propulsive unit 2 and of the connection system 3 in particular in terms of scheduling. In operation, the aircraft of the invention is advantageously converted by changing the fuselage.

Such an operation is relatively simple and can be realized rapidly by a maintenance team.

Such an operation of fuselage exchange of an aircraft is shown in FIGS. 6a-6d. To describe this operation is must be assumed that the connection system 3 has a support assembly 32 that can be separated from the fuselage 2 as shown in FIG. 4b, said operation being realizable but a priori more complex in a contrary case.

Figure 6A:
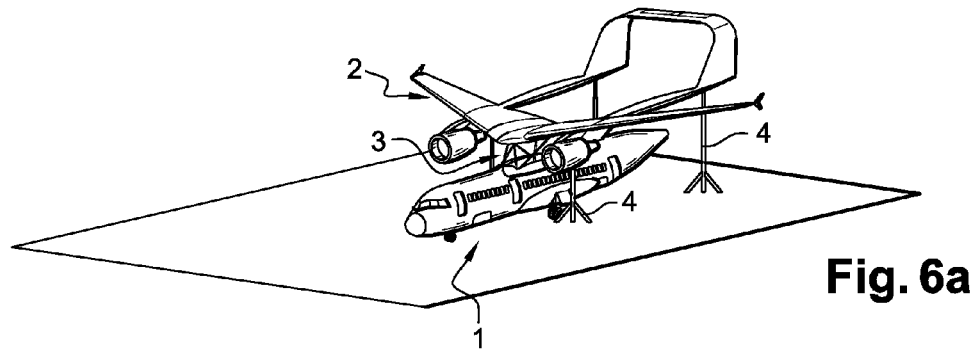
FIGS. 6a-6d: an illustration of an example of the sequence of replacement of a fuselage.

In a first step, FIG. 6a, after removal of the fairings from the fuselage 171 in the upper part of the fuselage, props 4, at least three and preferably four as illustrated, are placed in such a way as to support the aero-propulsive unit 2. The props 4 rest at the level of the aero-propulsive unit 2 at the level of the conventional jacking points of said aero-propulsive unit.

In a second step, the connection systems 315 between the fuselage 1 and the aero-propulsive unit 2 are disconnected at the level of support plate 32 and said support assembly is mechanically unfastened from said fuselage by disconnecting the fasteners (not shown) assuring the transmission of forces between said support assembly and the strong frames of the fuselage 14, 15 and/or the ceiling 16.

Figure 6B:
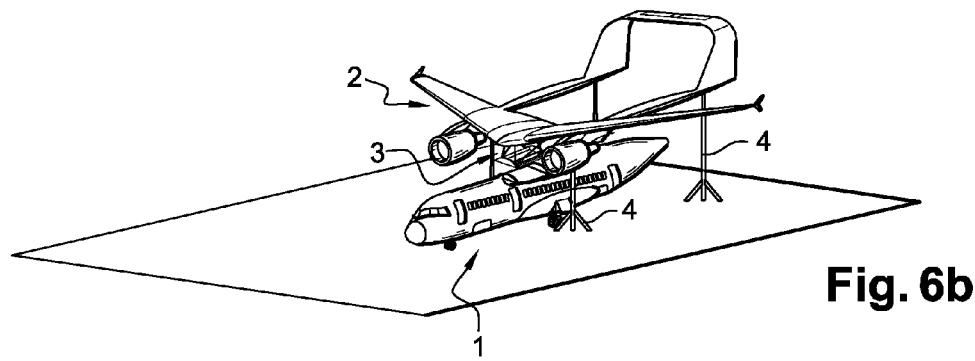

In a third step, FIG. 6b, the aero-propulsive unit 2 and the connection system 3 are lifted by the props 4 so that the support assembly 32 is positioned totally above the fuselage 1.

In a different operating mode of the third step, the props are put in place with the aero-propulsive unit 2 pre-positioned in a position of maximal height obtained by extension of the actuators 313 of the connection system 3. When the support plate 32 is disconnected from the fuselage, the actuators 313 are retracted so that the support plate 32 is in a raised position above the fuselage 1.

Figure 6C:
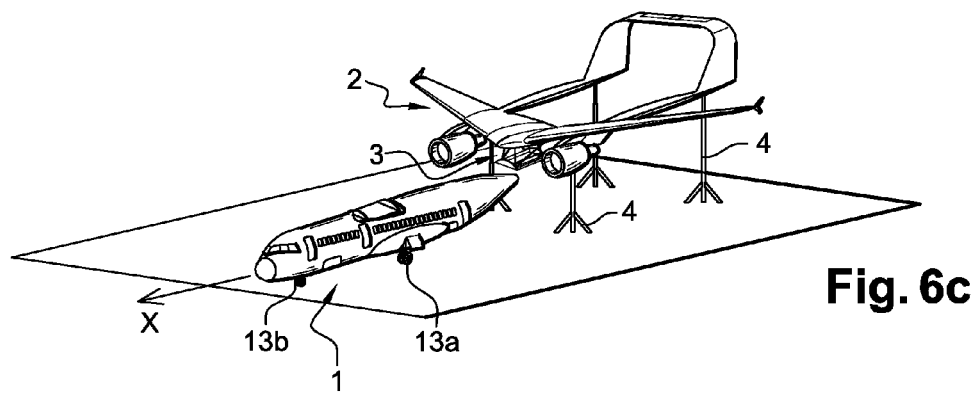

In a fourth step, the fuselage 1 is moved, FIG. 6C, by a movement in the X direction toward the front or rear, advantageously by moving the fuselage 1 on its landing gear 13a, 13b which is solidly attached to the fuselage. Such a movement is assured, e.g., by an autonomous system or realized by a conventional tractor without requiring a specific tool set.

Figure 6D:
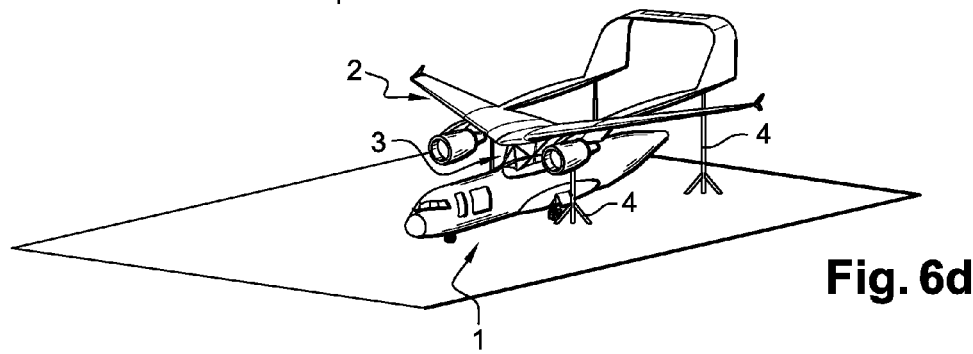

In the steps realized following a similar sequence to that of separation of the fuselage but in reverse order, another fuselage 1, e.g. a fuselage of the "cargo" type instead of the "passenger" type is fastened down, FIG. 6d, with the same aero-propulsive unit 2 by means of the connection system 3 which remains solidly affixed to said aero-propulsive unit.

It should be noted that in the sequence of exchanging fuselages it is not necessary to have great accuracy of pre-positioning as would be the case with a rigid assembly system. A tilting/shifting of the real position relative to the theoretical positions is easily corrected by moving the support plate 32 which is mobile in direction and orientation either by using action forces, e.g., by hand, directly on the support assembly if the actuators 313 are in a relaxed position or by using a remote control box if the actuators are supplied with energy.

In the examples of FIGS. 6a-6d a fuselage for transporting passengers is replaced by a fuselage for transporting cargo.

Such a fuselage adapted to transporting cargo has at least one door of large dimension, e.g., a side cargo door 14 of conventional type corresponding to the dimensions of the cargo pallets or standard containers.

Figure 7A:
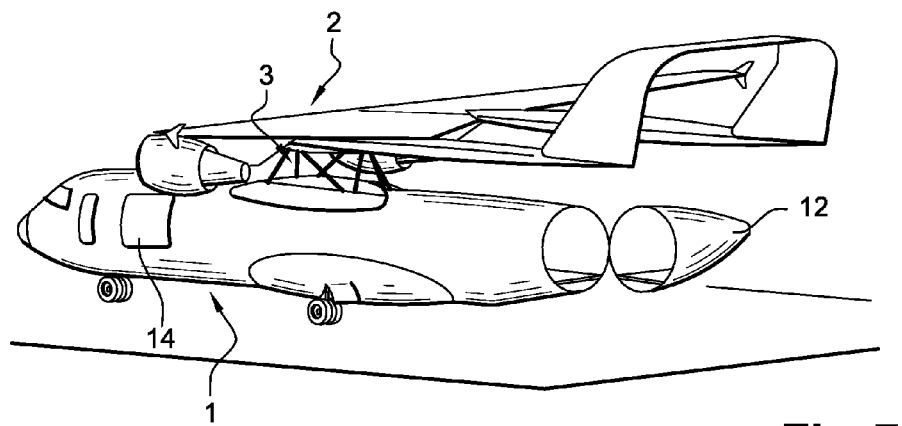
FIGS. 7a and 7b: perspective view of aircraft according to an embodiment illustrating two solutions of the cargo door openings.
Figure 7B:
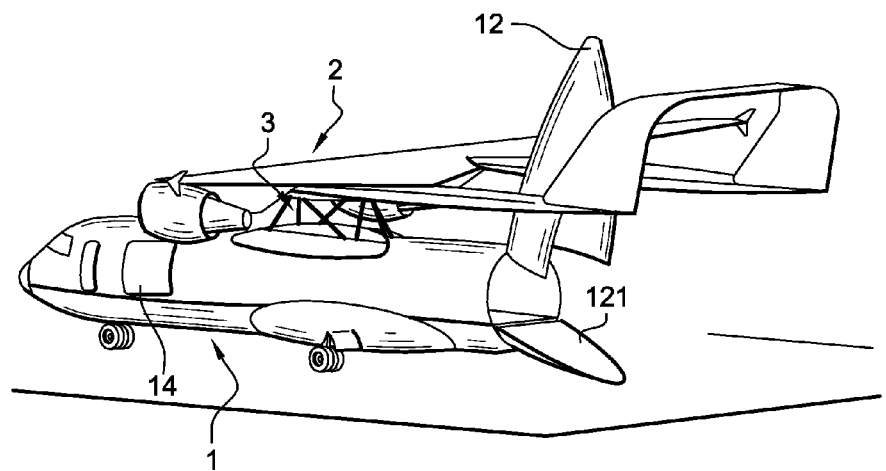

In a particularly advantageous manner, the use of a horizontal stabilizer 23 raised and held by two lateral beams 24a, 24b on which the vertical stabilizer 22a, 22b, is also affixed leads to a clean tail cone 12 free of all essential systems and disconnected from any structure permitting an opening to be made in the rear, creating an opening of cross section close to that of the cargo compartment of the fuselage 1 and in the axis of said fuselage, e.g., by rotating the tail cone 12 laterally, as illustrated in FIG. 7a, or upward and combined with a loading ramp 121, as illustrated in FIG. 7b.

An aircraft according to the invention has a fuselage 2 suspended under an aero-propulsive system 2 by means of a connection system 3 that assures different degrees of freedom in translation and in rotation therefore has numerous advantages and offers greater operating capacities, and its conventional flight control systems can be simplified even for certain movements that are forbidden for a conventional aircraft due to the redundancies provided by the means of the invention on the control of the movements of the aircraft.

Figure 8A:
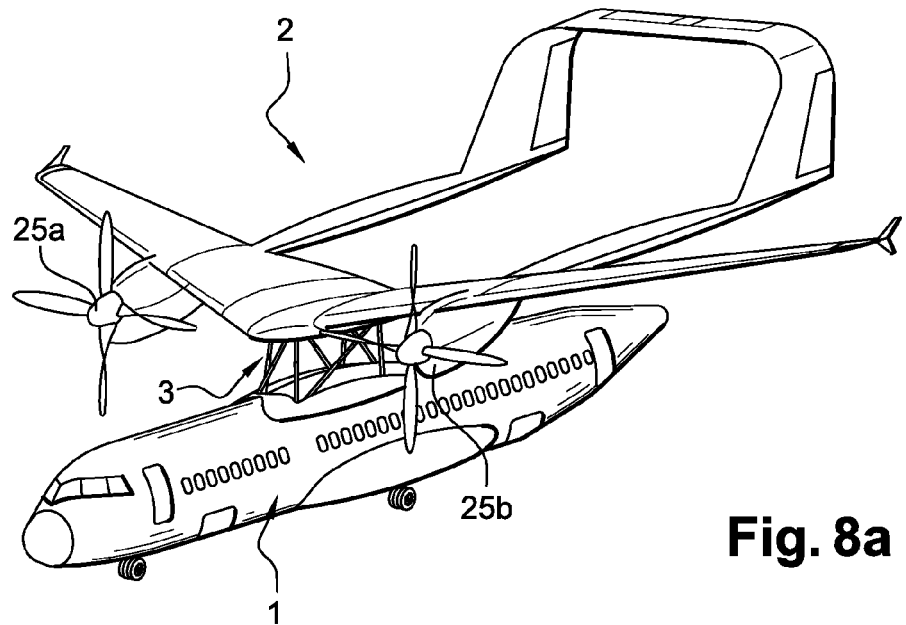
FIGS. 8a and 8b: perspective views of aircraft according to an embodiment using engines with conventional propellers, FIG. 8a, and with high-speed propellers, FIG. 8b.
Figure 8B:
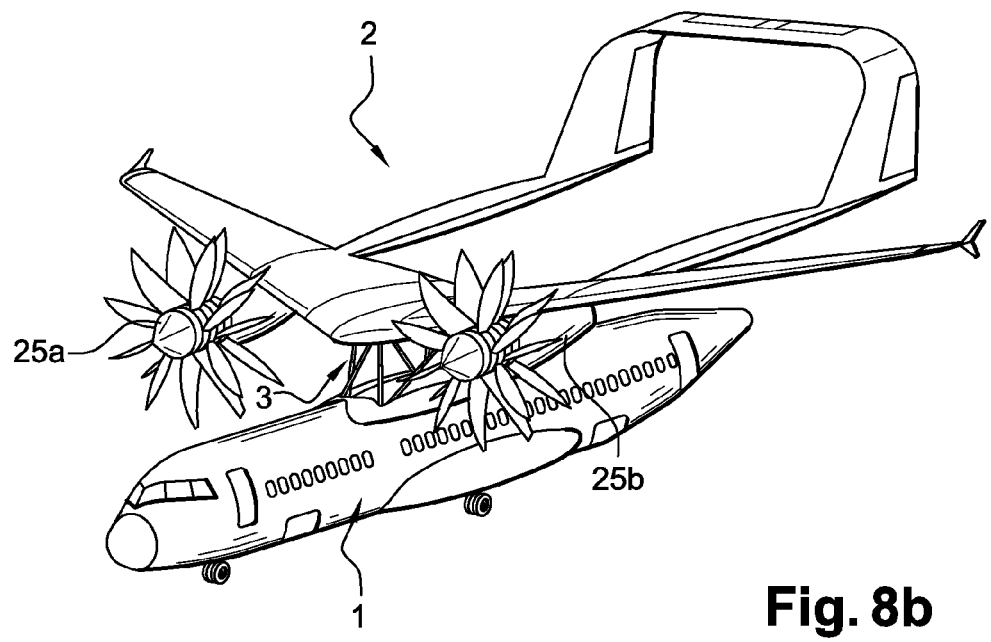

The invention is not limited to the example described in detail. It is applicable especially for different modes of propulsion, e.g. propulsion by conventional propeller engines as shown in FIG. 8a or high speed prop-fan engines as shown in FIG. 8b. the number of engines can also be different from two.

The invention is obviously not limited to the form illustrated of the fuselage nor the illustrated form of wing whose sweep angle, length, taper ratio or dihedral may be different as a function of the type of flight made by the aircraft nor to the form of the rear tail airfoils.

The invention claimed is:

1. An aircraft comprising:
   a reference system determined by a longitudinal X axis oriented positively toward a front of the aircraft, a vertical Z axis perpendicular to the X axis and oriented positively toward a bottom of the aircraft and a lateral Y axis perpendicular to the plane defined by the X and Z axes and oriented positively toward a right side of the aircraft;
   a wing affixed to an upper central part of the fuselage along the longitudinal X axis;
   a set of rear airfoils situated behind the wing; and
   propulsion engines mounted on the wing,
   wherein the wing, the set of rear airfoils and the propulsion engines are parts of an aero-propulsive unit, said aero-propulsive unit being a structure independent of the fuselage;
   and wherein the aero-propulsive unit is connected to the fuselage by a six degrees of freedom connection system using arms the lengths of which are modified to control a position of the aero-propulsive unit relative to the fuselage along the X, Y and Z axes of the reference system of the aircraft and in rotation about the three axes X, Y and Z, during flight.

2. The aircraft according to claim 1, in which the connection system comprises at least six arms, each having a lower end ball-jointed to the upper central part of the fuselage, and an upper end ball-jointed to a lower part of the wing.

3. The aircraft according to claim 2, wherein the upper ends of the supporting arms are ball-jointed in proximity to structural ribs of the wing.

4. The aircraft according to claim 2, wherein each arm comprises an actuator whose length is adaptable.

5. The aircraft according to claim 4, wherein each arm comprises an aerodynamic fairing enveloping the actuator.

6. The aircraft according to claim 5 wherein the lower ends of the arms are hinged to a support assembly having a front frame part, a rear frame part and spars solidly connected to said parts of the front and rear frame.

7. The aircraft according to claim 6, in which the support plate is fixed in a holder of the fuselage between a strong front frame and a strong rear frame and above a ceiling of a cabin of the fuselage.

8. The aircraft according to claim 7, in which the support assembly is attached to the fuselage by removable fasteners such that the aero-propulsive unit assembled with the connection system incorporating the support assembly can be separated from the fuselage.

9. The aircraft according to claim 5 in which at least one aerodynamic fairing enveloping an actuator also envelops conduits or cables of systems.

10. The aircraft according to claim 2, wherein the arms are arranged so that said arms constitute, with the structures to which they are attached, a unit having a latticework geometry with triangular meshes that is at least isostatic when the arms each have a specified length.

11. The aircraft according to claim 10, in which the connection system has eight.

12. The aircraft according to claim 1, wherein a flight control system of said aircraft controls the length of the arms of the connection system to modify the position of the aero-propulsive unit relative to the fuselage as a function of a position of a center of gravity of the aircraft.

13. The aircraft according to claim 1, wherein a flight control system of said aircraft controls the length of the arms of the connection system to modify the position of the aero-propulsive unit relative to the fuselage to modify a position relative to the wing relative to the fuselage as a function of a phase of flight.

14. The aircraft according to claim 1, wherein a flight control system of said aircraft controls the length of the arms of the connection system to modify the position of the air aero-propulsive unit relative to the fuselage to modify or to maintain a trajectory of the aircraft.

15. The aircraft according to claim 1, wherein a flight control system of said aircraft controls the length of the arms of the connection system to modify the position of the aero-propulsive unit relative to the fuselage to attenuate the effects of turbulence.

16. The aircraft according to claim 1, in which the rear airfoils are solidly affixed to the wing by two longitudinal beams.

17. The aircraft according to as claim 16, in which lengths of the longitudinal beams along the X axis are sufficient to permit an opening of a cargo door in a rear of the fuselage without mechanical interference between said cargo door and said beams and between said cargo door and the set of rear airfoils.

* * * * *

UNITED STATES PATENT AND TRADEMARK OFFICE
CERTIFICATE OF CORRECTION

PATENT NO. : 8,336,811 B2
APPLICATION NO. : 12/541256
DATED : December 25, 2012
INVENTOR(S) : Cazals et al.

It is certified that error appears in the above-identified patent and that said Letters Patent is hereby corrected as shown below:

Column 11, line 41, Claim 1, after "aircraft" insert -- a fuselage; --, therefor.

Column 11, line 58, Claim 2, after "each" insert -- arm --, therefor.

Column 12, line 2, Claim 3, after "the" delete "supporting", therefor.

Column 12, line 42, Claim 14, after "the" delete "air", therefor.

Signed and Sealed this
Twelfth Day of March, 2013

Teresa Stanek Rea
*Acting Director of the United States Patent and Trademark Office*